US012754590B2

(12) United States Patent
Fleming et al.

(10) Patent No.: US 12,754,590 B2
(45) Date of Patent: Oct. 6, 2026

(54) ROTATABLE CONTROL BUTTON ASSEMBLY FOR A WEARABLE DEVICE

(71) Applicant: Garmin International, Inc., Olathe, KS (US)

(72) Inventors: Caleb M. Fleming, Cary, NC (US); Shawn R. Harvill, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 19/197,864

(22) Filed: May 2, 2025

(65) Prior Publication Data

US 2025/0341869 A1 Nov. 6, 2025

Related U.S. Application Data

(60) Provisional application No. 63/642,109, filed on May 3, 2024.

(51) Int. Cl.

| | |
|---|---|
| ***G06F 1/16*** | (2006.01) |
| ***G04G 17/08*** | (2006.01) |
| ***G04G 21/08*** | (2010.01) |

(52) U.S. Cl.

CPC ........... *G06F 1/1671* (2013.01); *G04G 17/08* (2013.01); *G04G 21/08* (2013.01); *G06F 1/163* (2013.01); *G06F 1/1656* (2013.01); *G06F 1/1681* (2013.01); *G06F 1/1684* (2013.01)

(58) Field of Classification Search

CPC ...... G06F 1/1671; G06F 1/163; G06F 1/1656; G06F 1/1681; G06F 1/1684; G04G 17/08; G04G 21/08; G04G 21/00; G04G 21/02; G04C 3/004

See application file for complete search history.

(56) References Cited

U.S. PATENT DOCUMENTS

| | | | | |
|---|---|---|---|---|
| 10,474,194 B1 | 11/2019 | Ell et al. | | |
| 11,531,306 B2 | 12/2022 | Ely et al. | | |
| 2016/0098016 A1* | 4/2016 | Ely | ........................ | G04G 21/00 368/308 |
| 2025/0341808 A1 | 11/2025 | Wilder et al. | | |

FOREIGN PATENT DOCUMENTS

| | | | |
|---|---|---|---|
| WO | WO-2014200766 A1 * 12/2014 | ............. | G04C 3/004 |

OTHER PUBLICATIONS

Co-Pending, unpublished U.S. Appl. No. 19/197,865, filed May 2, 2025.

* cited by examiner

*Primary Examiner* — Christopher E Leiby

(74) *Attorney, Agent, or Firm* — Samuel M. Korte; Kathleen D. Fitterling

(57) ABSTRACT

A wearable electronic device comprising a housing. The device additionally comprises a Hall effect sensor enclosed within an interior of the housing and positioned adjacent to or engaged with an interior surface of the housing. The device further comprises a control button assembly engaged with the housing. An exterior of the housing presents a cavity in which at least a portion of the control button assembly is received. A proximal end of the control button assembly comprises a magnet. A distal end of the control button assembly comprises a crown that is rotatable with respect to the housing, and the control button assembly is configured such that rotation of the crown causes a corresponding rotation of the magnet. The housing comprises a sidewall, and the sidewall entirely separates the control button assembly from the Hall effect sensor.

20 Claims, 5 Drawing Sheets

ROTATABLE CONTROL BUTTON ASSEMBLY FOR A WEARABLE DEVICE

CROSS-REFERENCE TO RELATED APPLICATION

The present non-provisional application claims priority benefit to U.S. Provisional Patent Application Ser. No. 63/642,109, filed on May 3, 2024, and entitled "PUSHBUTTON ASSEMBLY FOR A WATCH." The entirety of the above-identified provisional patent application is hereby incorporated by reference into the present non-provisional application.

FIELD

Embodiments of the present invention are directed to wearable devices. More particularly, embodiments of the present invention are directed to rotatable control button assemblies for wearable electronic devices, such as wristwatches.

DESCRIPTION OF RELATED ART

Conventional wearable devices, such as wristwatches, often include input/output functionality that allows users to control the devices and receive outputs from the devices. Some conventional wearable devices utilize rotatable buttons or crowns, which are accessible from the exteriors of the wearable devices. Users can actuate such rotatable buttons or crowns to interact with and control functions of the devices. For a common wearable device, a rotatable button can be part of a control button assembly, with at least a portion of the control button assembly extending through a housing of the device. An internally positioned sensor within the housing of the device can, thus, sense when the crown has been rotated. For example, such a conventional wearable device can include an optical sensor positioned within an interior of the device's housing. The optical sensor can sense rotation of the device's crown by monitoring the portion of the device's control button assembly that extends through the housing.

Problematically, such a conventional control button assembly reduces the ability to seal the interior of the wearable device. Specifically, requiring a portion of the control button assembly to extend through the housing and into the interior of the wearable device reduces the ability to securely enclose the interior of the housing. Thus, internal components of the device that are positioned within the housing are potentially exposed to the external environment. As such, it would be beneficial if there were an improved control button assembly for a wearable device that included a rotatable button or crown that functioned in an accurate and consistent manner, while also allowing for the interior of the wearable device to remain sealed or otherwise protected from the external environment.

SUMMARY

Embodiments of the present invention comprise a wearable electronic device comprising a housing and a controller enclosed within an interior of the housing. The controller comprises a processor and memory. The device additionally comprises a Hall effect sensor enclosed within an interior of the housing and positioned adjacent to or engaged with an interior surface of the housing. The Hall effect sensor is communicatively coupled with the controller and configured to generate control signals for use by the controller to control functionality of the device. The device further comprises a control button assembly engaged with the housing. An exterior of the housing presents a cavity in which at least a portion of the control button assembly is received. A proximal end of the control button assembly comprises a magnet. A distal end of the control button assembly comprises a crown that is rotatable with respect to the housing, and the control button assembly is configured such that rotation of the crown causes a corresponding rotation of the magnet. Upon the magnet being rotated via rotation of the crown, the Hall effect sensor is configured to detect the rotation of the magnet. The housing comprises a sidewall, and the sidewall entirely separates the control button assembly from the Hall effect sensor. The control button assembly does not extend through the housing into the interior of the housing.

Embodiments of the present invention additionally include a wearable electronic device comprising a housing and a controller enclosed within an interior of the housing. The controller comprises a processor and memory. The device additionally comprises a Hall effect sensor enclosed within the interior of the housing and positioned adjacent to or engaged with an interior surface of the housing. The Hall effect sensor is communicatively coupled with the controller and configured to generate control signals for use by the controller to control functionality of the device. The device further comprises a control button assembly engaged with the housing. An exterior of the housing presents a cavity in which at least a portion of the control button assembly is received. A proximal end of the control button assembly comprises a magnet. A distal end of the control button assembly comprises a crown that is rotatable with respect to the housing, and the control button assembly is configured such that rotation of the crown causes a corresponding rotation of the magnet. The housing comprises a sidewall, and the sidewall entirely separates the control button assembly from the Hall effect sensor, such that the control button assembly is restricted from extending through the housing into the interior of the housing.

This summary is not intended to identify essential features of the present invention, and is not intended to be used to limit the scope of the claims. These and other aspects of the present invention are described below in greater detail.

BRIEF DESCRIPTION OF THE DRAWINGS

Embodiments of the present invention are described in detail below with reference to the attached drawing figures, wherein.

Figure 1:
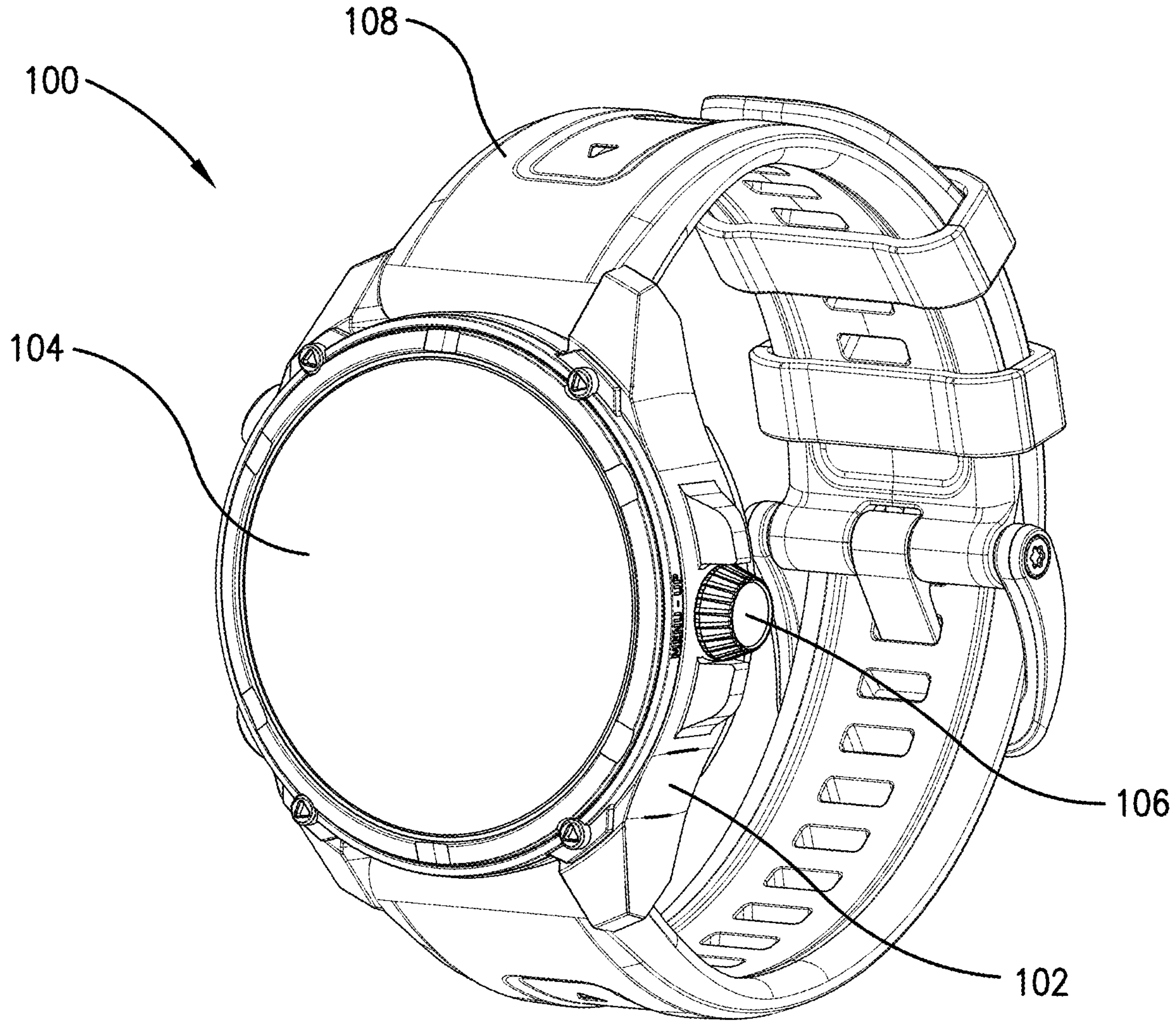
FIG. 1 is a perspective view of a mobile electronic device, in the form of a wearable wristwatch, according to embodiments of the present invention.

The figures are not intended to limit the present invention to the specific embodiments they depict. While the drawings do not necessarily provide exact dimensions or tolerances for the illustrated structures or components, the drawings are to scale with respect to the relationships between the components of the structures illustrated in the drawings.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

With reference to FIG. 1, embodiments of the present invention are directed to a mobile electronic device 100, which may be in the form of a wearable device such as a wristwatch. The device 100 may comprise a housing 102 or a case configured to substantially enclose various components of the device 100 within an interior of the device 100. The housing 102 may be formed from a lightweight and impact-resistant material such as plastic, nylon, or combinations thereof, for example. However, in other embodiments, the housing 102 may be formed from metal, such a stainless steel, titanium, aluminum, or the like, and/or combinations thereof. The housing 102 may be formed from a conductive material, a non-conductive material, and combinations thereof. The housing 102 may include one or more gaskets, e.g., a seal, to aid the device 100 in being substantially waterproof and/or water resistant. The housing 102 may enclose a battery and/or another power source for powering one or more components of the device 100. The housing 102 may be a singular piece or may include multiple sections.

The device 100 may additionally comprise a display device 104 with a user interface. The display device 104 may include a liquid crystal display (LCD), a thin film transistor (TFT), a light-emitting diode (LED), a light-emitting polymer (LEP), and/or a polymer light-emitting diode (PLED). The display device 104 may be capable of presenting text, graphical, and/or pictorial information. The display device 104 may be backlit such that it may be viewed in the dark or other low-light environments. One example embodiment of the display device 104 is a 100-pixel by 64-pixel film compensated super-twisted nematic display (FSTN) including a bright white light-emitting diode (LED) backlight. The display device 104 may include a transparent lens that covers and/or protects components of the device 100. The display device 104 may be provided with a touch screen to receive input (e.g., data, commands, etc.) from a user. For example, a user may operate the device 100 by touching the touch screen and/or by performing gestures on the screen. In some embodiments, the touch screen may be a capacitive touch screen, a resistive touch screen, an infrared touch screen, combinations thereof, and the like. The device 100 may further include one or more input/output (I/O) devices (e.g., a keypad, buttons, a wireless input device, a thumbwheel input device, etc.). The I/O devices may include one or more audio I/O devices, such as a microphone, speakers, and the like. Additionally, user input may be provided from movement of the housing 102, for example, an inertial sensor(s), e.g., accelerometer, may be used to identify vertical, horizontal, angular movement and/or tapping of the housing 102 or the lens.

In accordance with one or more embodiments of the present disclosure, the user interface of the device 100 may comprise one or more control buttons 106, which may be in the form of rotatable buttons or crowns. As illustrated in FIG. 1, one control button 106 is associated with, e.g., adjacent to, engaged with, and/or extending from, the housing 102. As will be described in more detail below, the control buttons 106 of the present invention may include and be engaged with the housing 102 via control button assemblies, which are described in more detail below. While FIG. 1 illustrates only one control button 106 associated with the housing 102, it is understood that the device 100 may include a greater or lesser number of control buttons 106. In one embodiment, each control button 106 of the device 100 is configured to generally control one or more functions of the device 100. Such functionality may be achieved by the user rotating or depressing the control buttons 106, as will be described in more detail below.

In some embodiments, the device 100 may include an attachment mechanism 108, e.g., a band or a strap, which enables the device 100 to be attached to and worn by a user. The attachment mechanism 108 may be coupled to and/or integrated with the housing 102 and may be removably secured to the housing 102 via attachment of securing elements to corresponding connecting elements. Some examples of securing elements and/or connecting elements include, but are not limited to, hooks, latches, clamps, snaps, and the like. The attachment mechanism 108 may be made of a lightweight and resilient thermoplastic elastomer and/or a fabric, for example, such that the attachment mechanism 108 may encircle a portion of a user without discomfort while securing the device 100 to the user. The attachment mechanism 108 may be configured to attach to various portions of a user, such as a user's leg, waist, wrist, forearm, upper arm, and/or torso.

FIG. 2B depicts a system diagram showing components of the device 100 that may be used to carry out certain functions of the device 100, such as those described herein. The device 100 may include a user interface module 116, a location determining component 118 (e.g., a global positioning system (GPS) receiver, assisted-GPS, etc.), a communication module 120, an inertial sensor 122 (e.g., accelerometer, gyroscope, etc.), and a controller 124.

Figure 2:
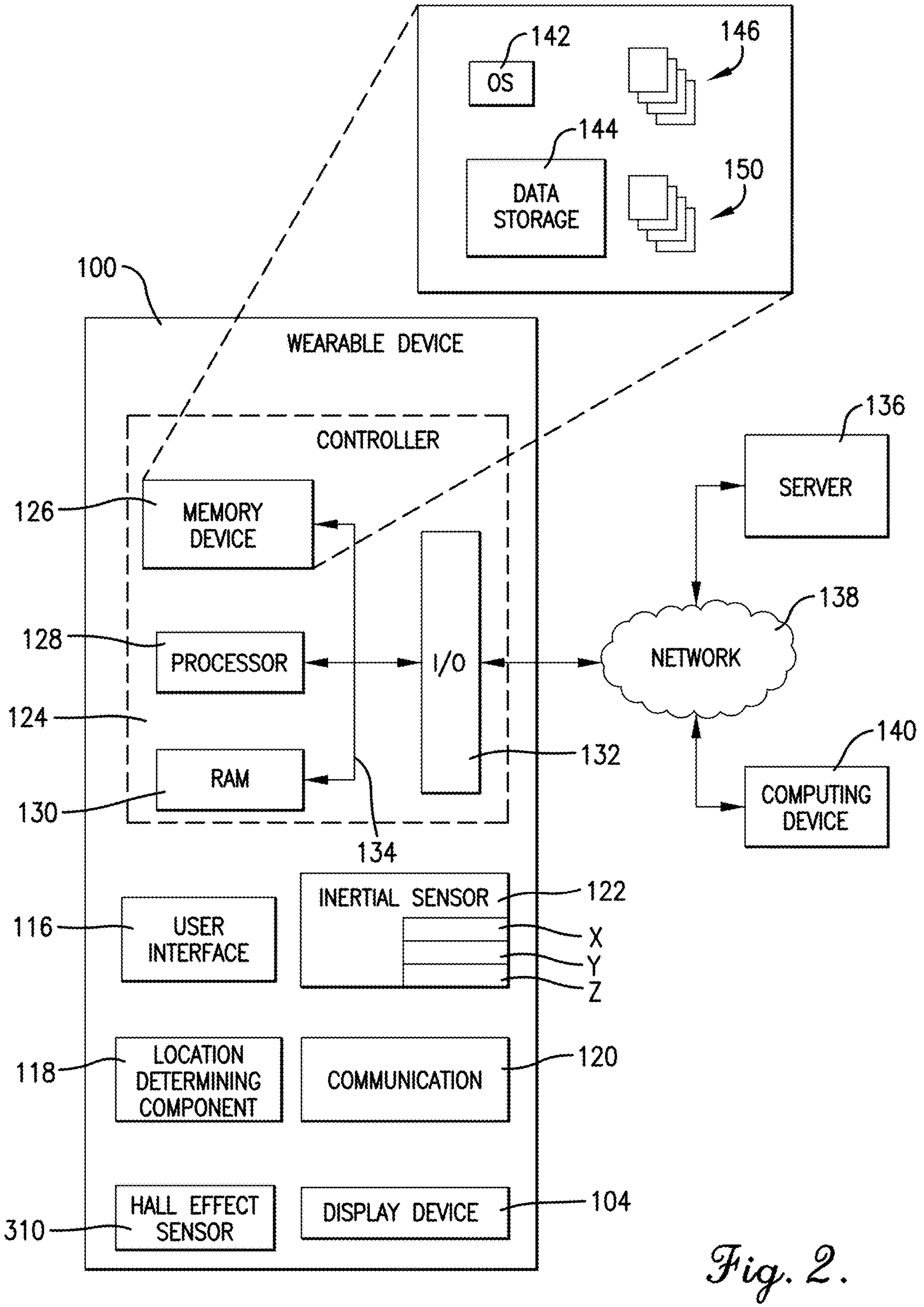
FIG. 2 is a schematic depiction of the mobile electronic device, including components thereof, in communication with remote systems over a network.

The controller 124 may comprise a control system and/or a processing system that includes a memory device 126, a processor and/or microprocessor (MP) 128, a random-access memory (RAM) 130, and an input/output (I/O) circuitry 132, all of which may be communicatively interconnected via an address/data bus 134. Although the I/O circuitry 132 is depicted in FIG. 2 as a single block, the I/O circuitry 132 may include a number of different types of I/O circuits.

Although the device 100 is generally described herein as a general-use wearable and mobile computing device (e.g., a wristwatch, activity band, etc.), the device 100 may alternatively comprise a cellular phone, a smartphone, a tablet computer, or a mobile personal computer. The device 100 may be a thin-client device or terminal that sends processing functions to a server device 136 via a network 138. Communication via the network 138 may include any combination of wired and wireless technology. For example, the network 138 may include a USB cable between the device 100 and a computing device 140 (e.g., smartphone, tablet, laptop, etc.) to facilitate the bi-directional transfer of data between the device 100 and the computing device 140.

The memory device 126 may include an operating system 142, a data storage device 144, a plurality of software applications 146, and/or a plurality of software routines 150. The operating system 142 of memory device 126 may include any of a plurality of mobile platforms, such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage device 144 of memory device 126 may include application data for the plurality of applications 146, routine data for the plurality of routines 150, and other data necessary to interact with the server 136 through the network 138.

In some embodiments, the components of the controller 124 may be positioned inside the interior of the housing 102 of the device 100. The controller 124 may also include or otherwise be operatively coupled for communication with other data storage mechanisms (e.g., one or more hard disk drives, optical storage drives, solid state storage devices, etc.) that may reside within the device 100 and/or operatively coupled to the network 138 and/or server device 136.

The location determining component 118 generally determines a current geolocation of the device 100 and may process a first electronic signal, such as radio frequency (RF) electronic signals, from a global navigation satellite system (GNSS) such as the global positioning system (GPS) primarily used in the United States, the GLONASS system primarily used in the Soviet Union, or the Galileo system primarily used in Europe. The location determining component 118 may include satellite navigation receivers, processors, controllers, other computing devices, or combinations thereof, and memory. The location determining component 118 may be in electronic communication with an antenna (not shown) that may wirelessly receive an electronic signal from one or more of the previously-mentioned satellite systems and provide the first electronic signal to location determining component 118. The location determining component 118 may process the electronic signal, which includes data and information, from which geographic information such as the current geolocation is determined. The current geolocation may include geographic coordinates, such as the latitude and longitude, of the current geographic location of the device 100. The location determining component 118 may communicate the current geolocation to the processor 128. Generally, the location determining component 118 is capable of determining continuous position, velocity, time, and direction (heading) information.

In some embodiments, the inertial sensor 122 may incorporate one or more accelerometers positioned to determine the acceleration and direction of movement of the device 100. The accelerometer may determine magnitudes of acceleration in an X-axis, a Y-axis, and a Z-axis to measure the acceleration and direction of movement of the device 100 in each respective direction (or plane). It will be appreciated by those of ordinary skill in the art that a three-dimensional vector describing a movement of the device 100 through three-dimensional space can be established by combining the outputs of the X-axis, Y-axis, and Z-axis accelerometers using known methods. Single and multiple axis models of the inertial sensor 122 are capable of detecting magnitude and direction of acceleration as a vector quantity and may be used to sense orientation and/or coordinate acceleration of the user.

Communication module 120 may enable device 100 to communicate with the computing device 140 and/or the server device 136 via any suitable wired or wireless communication protocol independently or using I/O circuitry 132. The wired or wireless network 138 may include a wireless telephony network (e.g., GSM, CDMA, LTE, etc.), one or more standard of the Institute of Electrical and Electronics Engineers (IEEE), such as 802.11 or 802.16 (Wi-Max) standards, Wi-Fi standards promulgated by the Wi-Fi Alliance, Bluetooth standards promulgated by the Bluetooth Special Interest Group, a near field communication standard (e.g., ISO/IEC 18092, standards provided by the NFC Forum, etc.), and so on. Wired communications are also contemplated such as through universal serial bus (USB), Ethernet, serial connections, and so forth.

The device 100 may be configured to communicate via one or more networks 138 with a cellular provider and an Internet provider to receive mobile phone service and various content, respectively. Content may represent a variety of different content, examples of which include, but are not limited to: map data, which may include route information; web pages; services; music; photographs; video; email service; instant messaging; device drivers; real-time and/or historical weather data; instruction updates; and so forth.

The user interface 116 of the device 100 may include a "soft" keyboard that is presented on the display device 104 of the device 100, an external hardware keyboard communicating via a wired or a wireless connection (e.g., a Bluetooth keyboard), and/or an external mouse, or any other suitable user-input device or component. The user interface 116 may also include or communicate with a microphone capable of receiving voice input from a vehicle operator as well as a display device 104 having a touch input. Furthermore, the user interface 116 may include the control buttons 106, which may be in the form of rotatable buttons or crowns that are described in more detail below.

With reference to the controller 124, it should be understood that controller 124 may include multiple processors and/or microprocessors 128, multiple RAMs 130 and multiple memory devices 126. The processor 128 may be a general or dedicated processing element. The processor 128 may generate, and store in memory device 126, data determined or generated by the device 100. The processor 128 may be further configured to control the display device 104 to present determined data. The controller 124 may implement the RAM 130 and the memory devices 126 as semiconductor memories, magnetically readable memories, and/or optically readable memories, for example. The one or more processors 128 may be adapted and configured to execute any of the plurality of software applications 146 and/or any of the plurality of software routines 150 residing in the memory device 126, in addition to other software applications. One of the plurality of applications 146 may be a client application that may be implemented as a series of machine-readable instructions for performing the various functions associated with implementing the performance monitoring system as well as receiving information at, displaying information on, and transmitting information from the device 100. The client application may function to implement a system wherein the front-end components communicate and cooperate with back-end components as described above. The client application may include machine-readable instructions for implementing the user interface 116 to allow a user to input commands to, and receive information from, the device 100. One of the plurality of applications 146 may be a native web browser, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server device 136 or other back-end components while also receiving inputs from the device 100. Another application of the plurality of applications 146 may include an embedded web browser that may be implemented as a series of machine-readable instructions for receiving, interpreting, and displaying web page information from the server device 136 or other back-end components within the client application.

The client applications 146 or routines may include an accelerometer routine that determines the acceleration and direction of movements of the device 100, which correlates to the acceleration, direction, and movement of the user. The accelerometer routine may receive and process data from the inertial sensor 122 to determine one or more vectors describing the motion of the user for use with the client application. In some embodiments where the inertial sensor 122 includes an accelerometer having X-axis, Y-axis, and Z-axis accelerometers, the accelerometer routine may combine the data from each accelerometer to establish the vectors describing the motion of the user through three-dimensional space. In some embodiments, the accelerometer routine may use data pertaining to less than three axes.

The client applications 146 or routines 150 may further include a velocity routine that coordinates with the location determining component 118 to determine or obtain velocity and direction information for use with one or more of the plurality of applications, such as the client application, or for use with other routines.

The user may also launch or initiate any other suitable user interface application (e.g., the native web browser, or any other one of the plurality of software applications 146) to access the server device 136 to implement the monitoring process. Additionally, the user may launch the client application from the device 100 to access the server device 136 to implement the monitoring process.

After the above-described data has been gathered or determined by the sensors of the device 100 and stored in memory device 126, the device 100 may transmit information to computing device 140 and server device 136 for storage and additional processing. For example, in embodiments where the device 100 is a thin-client device, the computing device 140 or the server 136 may perform one or more processing functions remotely that may otherwise be performed by the device 100. In such embodiments, the computing device 140 or server 136 may include a number of software applications capable of receiving user information gathered by the sensors. For example, the device 100 may gather information from its sensors as described herein, but instead of using the information locally, the device 100 may send the information to the computing device 140 or the server 136 for remote processing. The computing device 140 or the server 136 may perform the analysis of the gathered user information. For example, the information may be sent to computing device 140 or the server device 136 and include a request for analysis, where the information determined by the computing device 140 or the server device 136 is returned to device 100.

Figure 3:
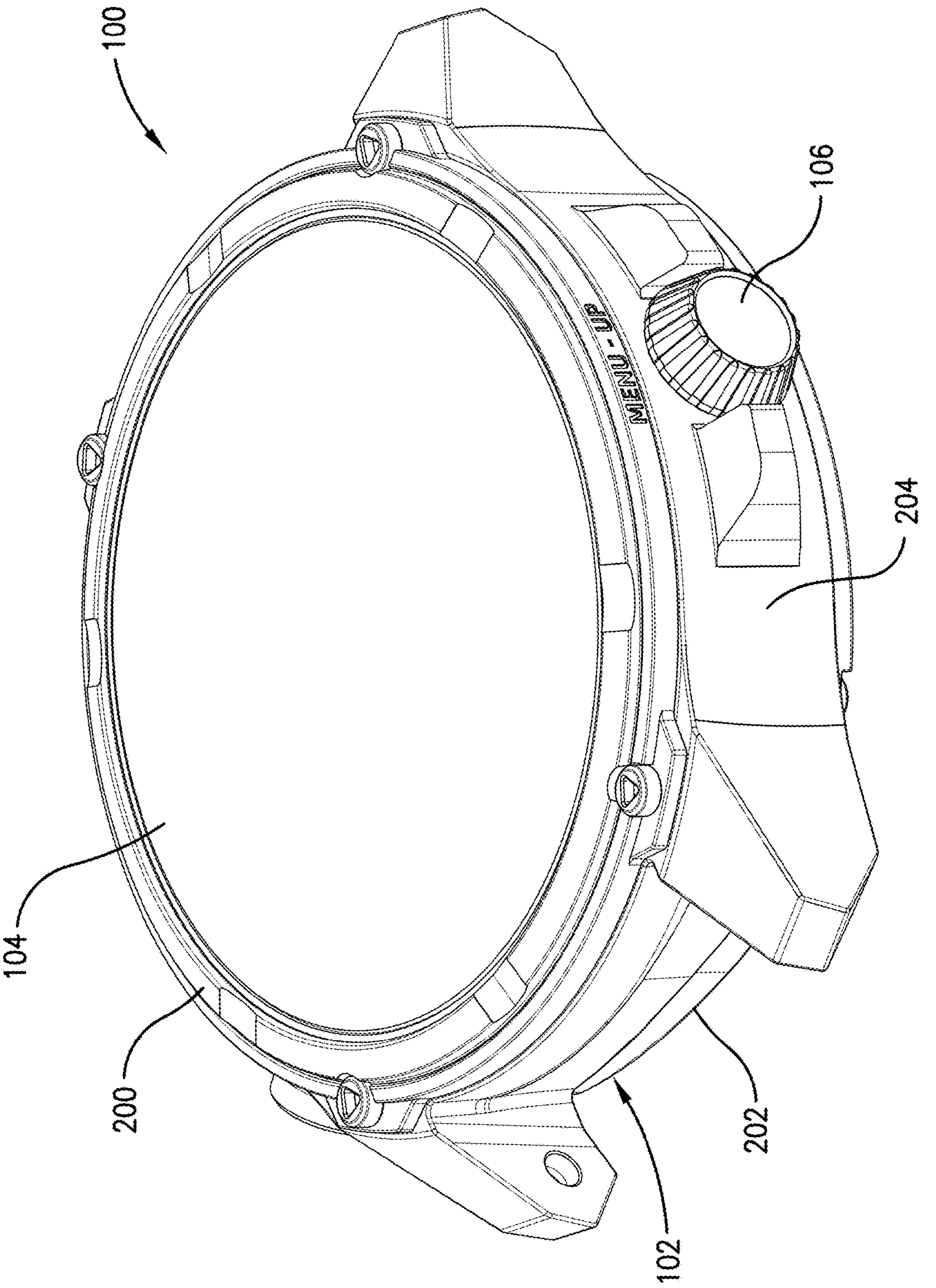
FIG. 3 is a perspective view of a housing and display device of the mobile electronic device of FIG. 1.

Certain embodiments of the present invention are directed to one or more control buttons 106 of the device 100. As shown in FIG. 3, the device 100 includes a single control button 106 on one side of the housing 102. The control button 106 may be configured as a rotatable button or crown that is accessible to receive a touch from a user's finger or thumb (of the opposite hand) to control functionality of the device 100. For example, the control button 106 may be rotated (or depressed) with respect to the housing 102 to control functionality of the device 100.

The housing 102 may comprise an upper wall 200, a lower wall 202, and a peripheral wall 204 extending between peripheries of the upper and lower walls 200, 202. As such, the housing 102 provides an interior space in which various components of the device 100 (e.g., components of the controller 124 illustrated in FIG. 2) may be housed. In some embodiments, the upper wall 200 of the housing 102 may be formed by a bezel with a circular, square, rectangular, or other geometric shape that surrounds the display device 104. The lower wall 202 of the housing 102 may have a circular, square, rectangular, or other geometric shape that generally corresponds with the shape of the upper wall 200.

Beneficially, the control buttons 106 of the device 100, according to embodiments of the present invention, are particularly configured to improve the sealing capabilities of the device 100, such as by allowing the control button 106 to function without the control buttons 106 (or components associated therewith) penetrating through the housing 102 of the device 100. As a result, the configuration of the device 100 results in an improved arrangement of components that enables the device 100 to withstand environmental challenges such as water ingress and pressure into the interior of the housing 102, thereby ensuring the durability and reliability of the device 100, including the control buttons 106, even in demanding conditions. Accordingly, the control buttons 106 according to embodiments of the present invention may be used with a housing 102 of a device 100 that is exposed to water and high-pressure environments, such as a dive watch and similar wearable devices.

Figure 4:
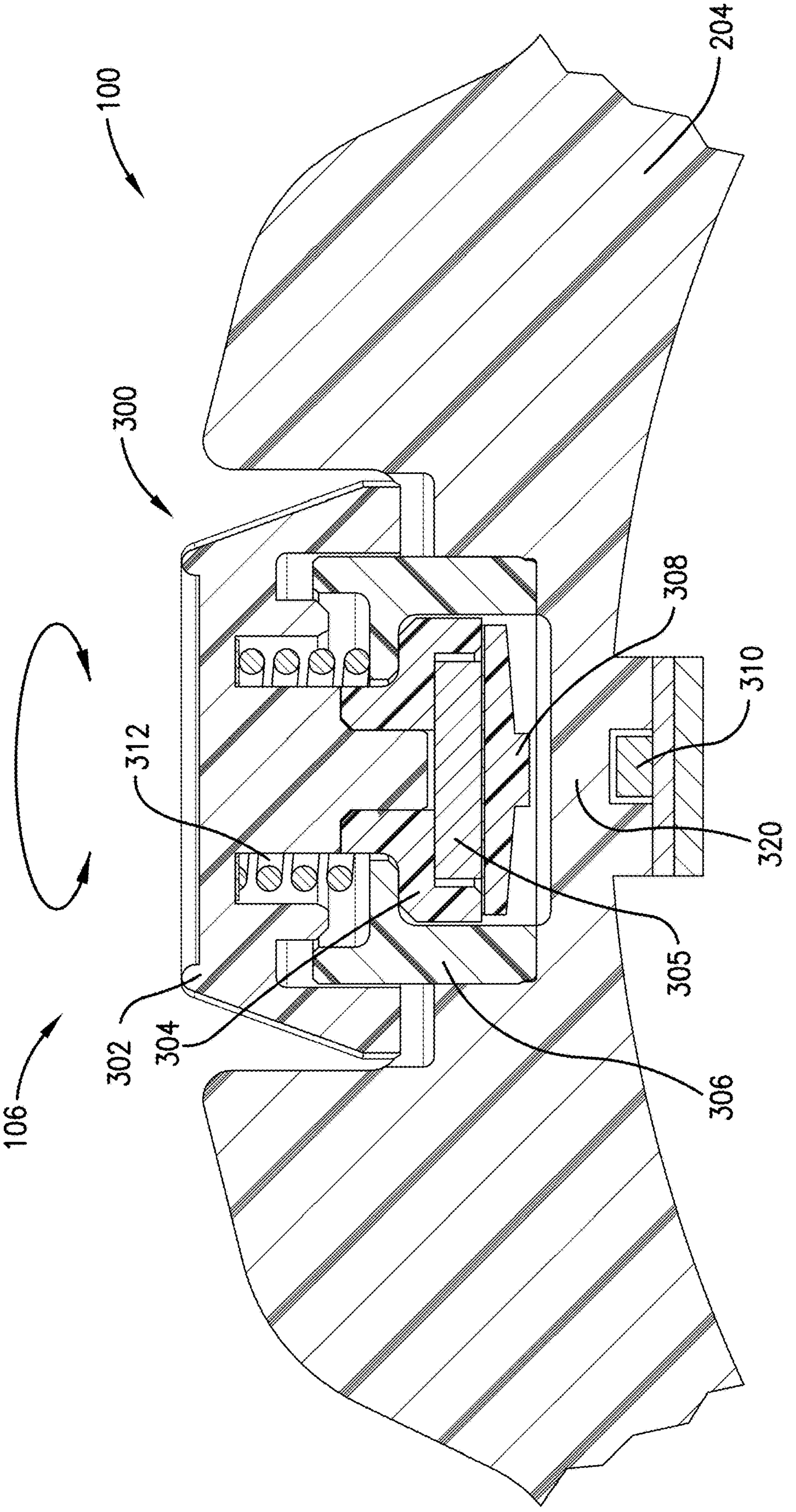
FIG. 4 is a partial cross section of a control button assembly and a Hall effect sensor engaged with the housing of the mobile electronic device of FIGS. 1 and 3, with a crown and a contact head of the control button assembly in a neutral position.

FIG. 4 illustrates one of the control buttons 106 of the device 100 in more detail. As shown, the control button 106 comprises a control button assembly 300 that may include a crown 302, a contact head 304, a magnet 305, and a mount 306. As shown, the control button assembly 300 may be positioned on the exterior of the housing 102 of the device 100, with the crown 302 being positioned at a distal end of the control button assembly 300 and the contact head 304 and/or the magnet 305 being positioned at a proximal end of the control button assembly. In certain embodiments, the control button 106 may additionally comprise or be associated with a snap dome 308 and a Hall effect sensor 310. As will be described in more detail below, rotation of the magnet 305 of the control button assembly 300 may be sensed by the Hall effect sensor 310 of the device 100, with the Hall effect sensor 310 being positioned and/or enclosed within the interior of the housing 102 of the device 100. As configured, the control button assembly 300 does not extend through the housing 102 into the interior of the housing 102, thereby improving the ability of the device 100 to be sealed from the external environment (e.g., water and pressures).

As illustrated by FIG. 4, the control button assembly 300 may be mounted to the exterior of the housing 102 via the mount 306 that is rigidly engaged with the exterior of the housing 102. In more detail, the exterior of the housing 102 may be formed with a cavity in which the mount 306 is received to, thereby, be rigidly engaged with the housing 102. The cavity may have different shapes depending on the shape of the mount 306; however, in some embodiments, both the cavity and the mount 306 will have a generally circular shape. The mount 306 may have a corresponding circular or cylindrical shape with exterior surfaces configured to engage with interior surfaces of the cavity formed in the housing 102. In some embodiments, the mount 306 will have an outer flange surface that mates with a shelf surface of the cavity. Regardless, the mount 306 will be rigidly engaged with the exterior of the housing 102.

The crown 302 and the contact head 304 of the control button assembly 300 may be movably supported by the mount 306 with respect to the housing 102 of the device 100. For instance, with continuing reference to FIG. 4, the mount 306 may have a cylindrical shape with a hollow interior in which the crown 302 and/or the contact head 304 are movably secured. In more detail, the crown 302 may comprise a circular main body that presents a contact surface on which a user of the device 100 may touch to rotate the crown 302 about an axis that extends radially through the device 100. The contact head 304 may also comprise a circular main body that presents a cavity in which the magnet 305 is mounted. The contact head 304 may additionally include an elongated, cylindrical connection element with a hollow interior that extends from the main body towards the crown 302. Correspondingly, the crown 302 may include an elongated, cylindrical connection element in the form of a projection that extends from the main body towards the contact head 304. As illustrated in FIG. 4, the connection element of the crown 302 will generally be received within the connection element of the contact head 304, such that movement of the crown 302 may cause a corresponding movement of the contact head 304, as will be discussed in more detail below.

The crown 302 and the contact head 304 may be retained within the mount 306 in such a manner that the crown 302 and the contact head 304 are configured to move with respect to the mount 306 and, thus, the housing 102 of the device 100. The contact head 304 may be retained within the mount 306 via the position of its main body being held in place between an interior flange of the mount 306 and the housing 102 of the device 100. The crown 302 may be retained within the mount 306 via a spring element 312 positioned between the main body of the crown 302 and the inner shelf of the mount 306. The spring element 312 may also be configured to bias the crown 302 in a neutral, non-activated/non-depressed position (i.e., the crown 302 is forced away from the housing 102 of the device 100 by the spring element 312).

The snap dome 308, as shown in FIG. 4, may be positioned between the contact head 304 and the housing 102 of the device 100. The snap dome 308 may comprise a dome-shaped, bi-stable mechanical element that inverts once a threshold actuation force is applied to its surface (e.g., when a user depresses the crown 302, thereby causing the contact head 304 and/or the magnet 305 into contact with the snap dome 308). The snap dome 308 will generally resist movement of the contact head 304 towards the sidewall 320 and against the snap dome 308. However, upon the contact head 304 applying at least the predefined actuation force to the snap dome 308, the snap dome 308 will invert creating a sharp movement activation force, which may be in the form of an impulse force, that is sufficient to provide a tactile feedback up through the contact head 304 and the crown 302 that can be felt by the user. As such, the snap dome 308 is configured to function as tactile detent.

The portion of the housing 102 that separates the control button assembly 300 and the snap dome 308 from the Hall effect sensor 310 may be referred to as a sidewall 320. The sidewall 320 may be a portion of the peripheral wall 204 of the housing 102. The contact head 304, the magnet 305, and/or the snap dome 308 may be positioned adjacent to and/or in contact with an exterior surface of the sidewall 320, while the Hall effect sensor 310 may be positioned adjacent to and/or in contact with an interior surface of the sidewall 320. Regardless, although the magnet 305 and the Hall effect sensor 310 may be positioned on opposite sides of the sidewall 320, the magnet 305 and the Hall effect sensor 310 may be positioned such that their centers are generally aligned in a radial direction of the device 100. For instance, the center of the Hall effect sensor 310 may be radially aligned with the center of the magnet 305 (while remaining separated by the sidewall 320). Such alignment of the components enables an accurate sensing of the movement and/or position of the magnet 305 by the Hall effect sensor 310, as will be discussed in more detail below.

Turning to the snap dome 308 in more detail, the snap dome 308 may have dome shape and may be positioned adjacent to and/or in engagement with an exterior side of the sidewall 320. The snap dome 308 may be formed from a material and may have a thickness that allows the snap dome 308 to generate a sufficient impulse force once the snap dome 308 inverts such that the inversion (and the corresponding impulse force) acts as tactile feedback when a user depressed the crown 302. For example, the snap dome 308 may be formed from plastic, rubber, or other polymer, as well as various flexible metals.

Because, in certain embodiments, the snap dome 308 is dome shaped, the snap dome 308 may be formed with a convex side and a concave side. In some embodiments, the snap dome 308 will be positioned with the convex side facing outward from the sidewall 320 towards the contact head 304 and/or magnet 305 of the control button assembly 300, as shown in FIG. 4. As a result, when a user pushes downward on the crown 302 (towards the sidewall 320), the contact head 304 and/or magnet 305 will be forced downward (towards the sidewall 320) towards and/or into contact with the convex side of the snap dome 308. Upon the force applied by the user being sufficient for the contact head 304 to apply the predefined actuation force against the snap dome 308, the snap dome 308 will invert and generate and send an impulse force upward through the control button assembly 300, which can be sensed by the user as a tactile feedback. In alternative embodiments, the snap dome 308 will be positioned with the concave side facing outward from the sidewall 320 towards the contact head 304 and/or magnet 305 of the control button assembly 300.

Turning to the Hall effect sensor 310 in more detail, the Hall effect sensor 310 may broadly comprise a magnetic field sensor configured to detect the presence and strength of magnetic fields. As such, the Hall effect sensor 310 is configured to detect the position and/or movement of the magnet 305 of the control button assembly 300. The Hall effect sensor 310 may be positioned adjacent to and/or in contact with an interior side of the sidewall 320. Specifically, the Hall effect sensor 310 may be mounted securely to the interior of the sidewall 320 of the housing 102, or to another internal structure of the device 100, such as a printed circuit board (PCB) positioned within the interior of the housing 102. As such, the Hall effect sensor 310 is suitably positioned to sense the magnetic field generated by the magnet

305 and, thus, sense the position and/or any movement of the magnet 305 (e.g., as caused by the movement of the control button assembly 300).

The Hall effect sensor 310 may be communicatively coupled with the controller 124 (e.g., the processor 128), such that the Hall effect sensor 310 can provide a signal (e.g., a control signal) indicative of the position and/or movement of the magnet 305 (e.g., as caused by the movement of the control button assembly 300) to the controller 124. As a result, the controller 124 can determine from the information received from the Hall effect sensor 310 that the control button assembly 300 has been actuated by a user. Examples of such user actuation include rotation of the crown 302 clockwise/counterclockwise, as well as depressing the crown 302 from the neutral position to the depressed position.

In more detail, the control button assembly 300 of the device 100 described above can be actuated by a user to control one or more functions of the device 100. For example, the user may provide an instruction to the device 100 to perform a function by actuating the crown 302 of the control button assembly 300. As noted above, the crown 302 and the contact head 304 are configured to cooperatively actuate with respect to the mount 306 and the housing 102 of the device 100. In addition, the magnet 305 is rigidly mounted to the contact head 304, such that movement of the crown 302 will cause a corresponding movement of the contact head 304 and the magnet 305.

As an example, the user may provide an instruction to the device 100 to perform a function by rotating the crown 302 clockwise or counterclockwise, which will cause a corresponding rotation of the contact head 304 and the magnet 305. Such rotation of the magnet 305 will create a change in the magnetic field of the magnet, which can be detected by the Hall effect sensor 310. Upon detecting such change in the magnetic field, the Hall effect sensor 310 will provide a corresponding control signal to the controller 124. The controller 124 will consequently cause the device 100 to perform the appropriate function associated with the actuation of the crown 302. Notably, during the actuation of the control button assembly 300 and the sensing performed by the Hall effect sensor 310, the control button assembly 300 and the Hall effect sensor 310 remain separated by the sidewall 320 (i.e., the control button assembly 300 is positioned externally with respect to the housing 102, while the Hall effect sensor 310 and the controller 124 remain positioned within the interior of the housing 102).

Figure 5:
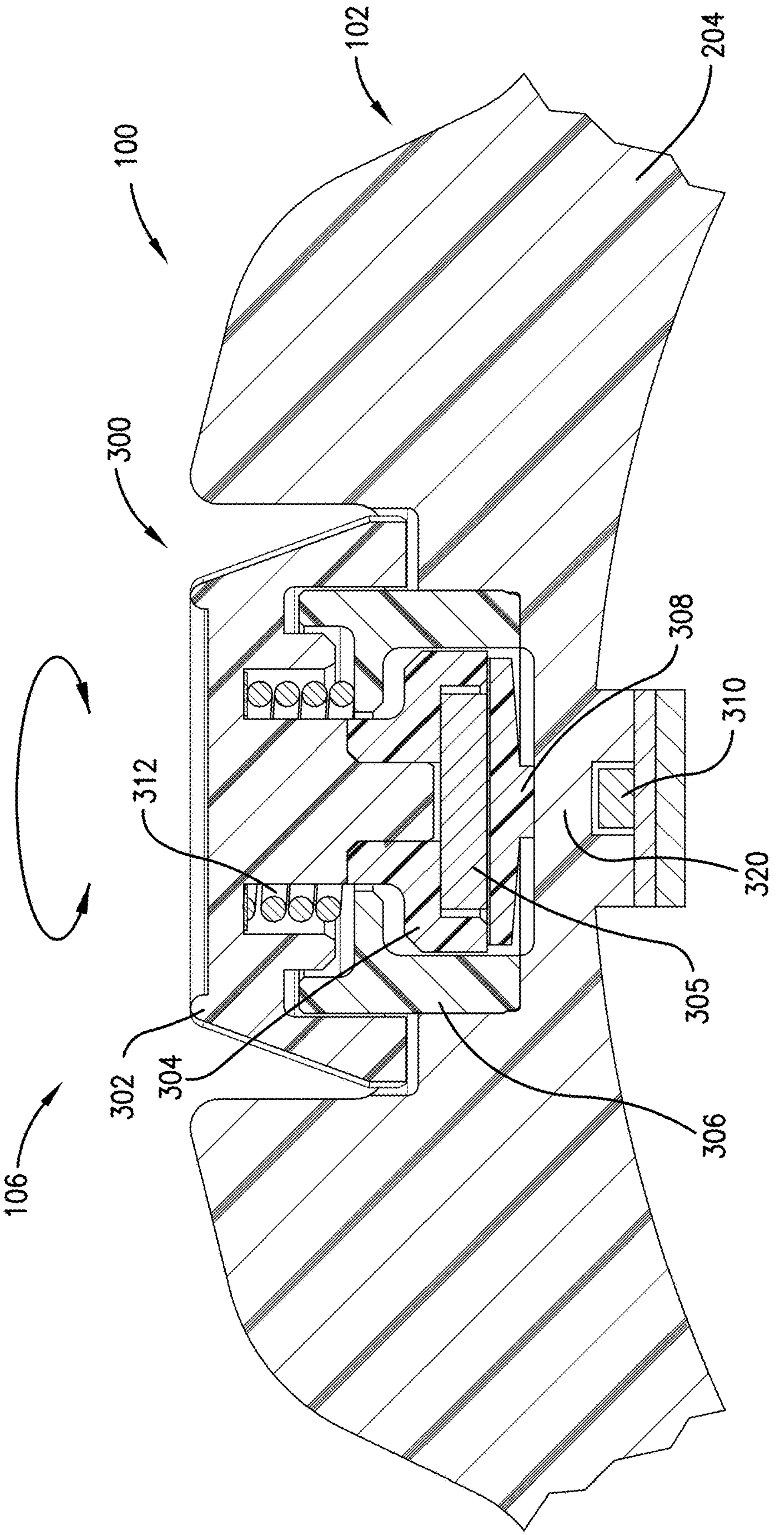
FIG. 5 is another partial cross section of the control button assembly and the Hall effect sensor from the mobile electronic device of FIG. 4, with the crown and the contact head of the control button assembly in a depressed position.

In some alternative embodiments of providing instructions to the device 100, the user may actuate the crown 302 by depressing the crown 302, such that the crown 302 shifts from the neutral position (see, e.g., FIG. 4) towards the sidewall 320 of the housing 102 to the depressed position (sec, e.g., FIG. 5). Because the control button assembly 300 is configured such that movement of the crown 302 will cause a corresponding movement of the contact head 304 and the magnet 305, depression of the crown 302 causes a corresponding shifting of the contact head 304 and the magnet 305 from the neutral position (see, e.g., FIG. 4) towards the sidewall 320 of the housing 102 to the depressed position (see, e.g., FIG. 5). The Hall effect sensor 310 is configured to detect the position of the magnet 305 being shifted from the neutral position to the depressed position, and the Hall effect sensor 310 will provide a corresponding control signal to the controller 124. The controller 124 will consequently cause the device 100 to perform the appropriate function associated with the actuation of the crown 302. Notably, during the actuation of the control button assembly 300 and the sensing performed by the Hall effect sensor 310, the control button assembly 300 and the Hall effect sensor 310 remain separated by the sidewall 320 (i.e., the control button assembly 300 is positioned externally with respect to the housing 102, while the Hall effect sensor 310 and the controller 124 remain positioned within the interior of the housing 102).

Furthermore, upon the contact head 304 and/or the magnet 305 being depressed and imparting an actuation force (which exceeds a threshold actuation force of the snap dome 308) against the snap dome 308, the snap dome 308 will invert and generate an impulse force. Such an impulse force may be in the form of a tactile feedback force that travels up through the control button assembly 300, such that the tactile feedback can be sensed by the user. Specifically, the impulse force generated by the inversion of the snap dome 308 will provide a tactile feedback that is indicative of the control button assembly 300 being properly actuated to cause the requisite functionality of the device 100. For example, the snap dome 308 may provide improved tactile feedback to the user, indicating a successful actuation of the crown 302 through a noticeable "click" sensation, a feature that is particularly valuable in conditions where visual or auditory confirmation may be limited. As a result, use of the snap dome 308 in the control button assembly 300 improves tactile feel of successful crown 302 presses and sets a mechanical threshold that must be exceeded for each successful crown 302 press. Upon the user releasing the crown 302, the spring element 312 will bias the crown 302 (and thus the contact head 304 and the magnet 305) back to the neutral position.

As described above, the Hall effect sensor 310 is configured to detect the position or motion of the magnet 305, which corresponds with an associated actuation of the crown 302 of the control button assembly 300 of the control button 106. The sidewall 320 acts as a mechanical barrier between the Hall effect sensor 310 positioned within the interior of the housing 102 and the control button assembly 300 positioned on the exterior of the housing 102. As such, the interior of the device 100 using the improved control button 106 can remain sealed from the external environment. Use of the improved control button 106 in a dive watch or an outdoor watch may improve the robustness and reliability of such watches.

The control button 106 according to embodiments of the present invention, as described above, is particularly configured to allow the interior of the device 100 to be sealed from the external environment. For example, because the control button assembly 300 is physically separated from the Hall effect sensor 310 by the sidewall 320, the interior of the housing 102 can remain sealed from the external environment. Stated differently, the control button assembly 300 is configured such that it does not extend through the housing 102 (e.g., through the sidewall 320) into the interior of the housing 102. Because the control button assembly 300 is partially positioned within the cavity on the exterior of the housing 102 of the device 100, and because the housing 102 (and particularly the sidewall 320) separates and encloses the Hall effect sensor 310 and other internal components of the device 100 in an internal cavity of the device's 100 housing 102, embodiments of the present invention result in an improved arrangement of components that enables the device 100 to withstand environmental challenges such as water ingress and pressure, ensuring the durability and reliability of the control button 106 in demanding conditions. Accordingly, the control button 106 may be used within a device 100 housing 102 that is exposed to water and/or high-pressure environments, such as a dive watch and similar wearable devices. Additionally, the control button 106 may be employed in marine chart plotters, dive computers, avionics, bicycle computers, and the like. Nevertheless, it is to be understood that the techniques and improvements described herein may be implemented in any portable, wearable or mounted electronic device having control buttons, such as a device utilized in marine applications that may be subject to water (e.g., a watch, a mobile phone, a hand-held portable computer, a tablet computer, a personal digital assistant, a multimedia device, a media player, a game device, or any combination thereof).

In some combinations, magnetically permeable materials may be strategically utilized within or around the control button assembly 300 and the Hall effect sensor 310 to shape and direct the magnetic field generated by the magnet 305. For instance, various components of the device 100—such as the snap dome 308, portions of the housing 102 (including the sidewall 320), layers of the printed circuit board (PCB) to which the Hall effect sensor 310 is mounted, or dedicated magnetic shielding elements—may be formed from or include magnetically permeable materials. These materials may include ferromagnetic alloys, soft magnetic composites, or selectively doped polymers configured to enhance magnetic flux concentration or to redirect magnetic field lines. When properly arranged, such materials may shape the magnetic flux path to concentrate or redirect the magnetic field toward the sensing area of the Hall effect sensor 310.

For example, the housing 102 may be formed, at least in part, using nano-molding technology (NMT) to integrate magnetically permeable materials directly within the sidewall 320 or adjacent regions. Similarly, the snap dome 308 may be fabricated from a polymer or metallic composite that to influence the nearby magnetic field. Moreover, one or more internal PCB layers may be embedded with ferromagnetic vias or traces to channel magnetic flux toward the Hall effect sensor 310 while simultaneously isolating sensitive circuit components from unintended magnetic interference. In some embodiments, discrete magnetic shields or flux guides may be positioned proximate to the Hall effect sensor 310 to prevent stray fields from influencing other electronic components of the device 100.

When the proximal end of the magnet 305 is positioned in close proximity to the snap dome 308, and the snap dome 308 is engineered with a material composition exhibiting sufficiently high magnetic permeability, the snap dome 308 itself may function as a localized magnetic flux guide. Specifically, the geometry and placement of the snap dome 308 may be configured to preferentially influence the Z-axis component of the magnetic field—i.e., the component orthogonal to the plane of the Hall effect sensor 310—while minimally affecting the X or Y components of the field. This selective shaping of the magnetic field may enhance the ability of the Hall effect sensor 310 to discern axial displacement (e.g., during crown 302 depression) with greater precision.

In configurations where the Hall effect sensor 310 is mounted on a flexible printed circuit (FPC) and aligned with the interior surface of the sidewall 320, the FPC may be constructed with or include an integrated stiffener formed from a material with high magnetic permeability, such as mu-metal. This stiffener may serve a dual purpose: first, to physically support and stabilize the Hall effect sensor 310 for precise alignment and consistent performance; and second, to act as a magnetic shield that prevents the magnetic field generated by the magnet 305 from propagating deeper into the interior of the device 100, thereby protecting other sensitive electronics (e.g., a magnetometer or compass module) from magnetic interference. In addition to blocking stray flux, the stiffener may also be geometrically configured to shape or redirect the magnetic field toward the sensing region of the Hall effect sensor 310. Alternatively, or in combination with the stiffener, a magnetic bracket may be positioned around the Hall effect sensor 310. Such a bracket may be fabricated from high-permeability material and designed to encase or partially surround the sensor, to provide desired magnetic effects.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The invention claimed is:

1. A wearable electronic device comprising:

a housing;

a controller enclosed within an interior of the housing, wherein the controller comprises a processor and memory;

a Hall effect sensor enclosed within the interior of the housing and positioned adjacent to or engaged with an interior surface of the housing, wherein the Hall effect sensor is communicatively coupled with the controller and configured to generate control signals for use by the controller to control functionality of the device; and a control button assembly engaged with the housing, wherein an exterior of the housing presents a cavity in which at least a portion of the control button assembly is received, wherein a proximal end of the control button assembly comprises a magnet, wherein a distal end of the control button assembly comprises a crown that is rotatable with respect to the housing, and wherein the control button assembly is configured such that rotation of the crown causes a corresponding rotation of the magnet, wherein upon the magnet being rotated via rotation of the crown, the Hall effect sensor is configured to detect the rotation of the magnet, wherein the housing comprises a sidewall, and wherein the sidewall entirely separates the control button assembly from the Hall effect sensor, the sidewall forming a continuous material barrier between the control button assembly and the Hall effect sensor, and wherein the control button assembly does not extend through the housing into the interior of the housing.

2. The wearable electronic device of claim 1, wherein the control button assembly comprises a contact head positioned between the crown and the sidewall.

3. The wearable electronic device of claim 2, wherein the contact head presents a cavity in which the magnet is mounted.

4. The wearable electronic device of claim 1, wherein the control button assembly further comprises a mount rigidly secured to the housing within the cavity, wherein the crown and the magnet are configured to rotate with respect to the mount and to the housing.

5. The wearable electronic device of claim 1, wherein when the crown is actuated towards the sidewall of the housing, the magnet is configured to be correspondingly shifted towards the sidewall.

6. The wearable electronic device of claim 5, wherein upon the magnet being shifted toward the sidewall, the Hall effect sensor is configured to detect the position of the magnet being shifted toward the sidewall.

7. The wearable electronic device of claim 6, wherein the control button assembly further includes a spring that biases the magnet away from the sidewall.

8. The wearable electronic device of claim 6, wherein the control button assembly further comprises a snap dome positioned between the magnet and the sidewall of the housing, wherein the snap dome is configured to resist movement of the magnet towards sidewall until a threshold actuation force is applied to the snap dome.

9. The wearable electronic device of claim 8, wherein upon the threshold actuation force being applied to the snap dome, the snap dome provides tactile feedback.

10. The wearable electronic device of claim 1, wherein the wearable electronic device is a wristwatch.

11. The wearable electronic device of claim 10, wherein the wristwatch is a dive watch configured to operate underwater.

12. The wearable electronic device of claim 11, wherein the dive watch is water resistant such that the dive watch is configured to restrict water from entering the interior of the housing when the dive watch is underwater.

13. The wearable electronic device of claim 1, wherein the housing is formed from plastic or metal.

14. A wearable electronic device comprising:

a housing;

a controller enclosed within an interior of the housing, wherein the controller comprises a processor and memory;

a Hall effect sensor enclosed within the interior of the housing and positioned adjacent to or engaged with an interior surface of the housing, wherein the Hall effect sensor is communicatively coupled with the controller and configured to generate control signals for use by the controller to control functionality of the device; and a control button assembly engaged with the housing, wherein an exterior of the housing presents a cavity in which at least a portion of the control button assembly is received, wherein a proximal end of the control button assembly comprises a magnet, wherein a distal end of the control button assembly comprises a crown that is rotatable with respect to the housing, and wherein the control button assembly is configured such that rotation of the crown causes a corresponding rotation of the magnet, wherein the housing comprises a sidewall, and wherein the sidewall entirely separates the control button assembly from the Hall effect sensor, the sidewall forming a continuous material barrier between the control button assembly and the Hall effect sensor, such that the control button assembly is restricted from extending through the housing into the interior of the housing.

15. The wearable electronic device of claim 14, wherein upon the magnet being rotated via rotation of the crown, the Hall effect sensor is configured to detect the rotation of the magnet.

16. The wearable electronic device of claim 15, wherein the control button assembly further comprises a mount rigidly secured to the housing within the cavity, wherein the crown and the magnet are configured to rotate with respect to the mount and to the housing.

17. The wearable electronic device of claim 14, wherein when the crown is actuated towards the sidewall of the housing, a position of the magnet is correspondingly shifted towards the sidewall, wherein upon the magnet being shifted toward the sidewall, the Hall effect sensor is configured to detect the position of the magnet being shifted toward the sidewall.

18. The wearable electronic device of claim 17, wherein the control button assembly further comprises a snap dome positioned between the magnet and the sidewall of the housing, wherein the snap dome is configured to resist movement of the magnet towards the sidewall until a threshold force is applied to the snap dome, wherein upon the threshold force being applied to the snap dome, the snap dome provides tactile feedback.

19. The wearable electronic device of claim 14, wherein the wearable electronic device is a wristwatch.

20. The wearable electronic device of claim 19, wherein the wristwatch is a dive watch configured to operate underwater.

* * * * *